United States Patent [19]

Ogawa et al.

[11] Patent Number: 5,126,897
[45] Date of Patent: Jun. 30, 1992

[54] MAGNETIC RECORDING/REPRODUCING APPARATUS CAPABLE OF REDUCING A SETTING TIME IN A HEAD POSITIONING CONTROL MODE

[75] Inventors: Tomihisa Ogawa, Oome; Osami Tsukamoto, Mitaka, both of Japan

[73] Assignee: Kabushiki Kaisha Toshiba, Kawasaki, Japan

[21] Appl. No.: 502,795

[22] Filed: Apr. 2, 1990

[30] Foreign Application Priority Data

Apr. 4, 1989 [JP] Japan .................................. 1-85357

[51] Int. Cl.$^5$ .......................... G11B 5/55; G11B 5/596
[52] U.S. Cl. .............................. 360/78.09; 360/78.06; 360/77.05
[58] Field of Search ................ 360/77.01, 77.02–77.11, 360/78.01, 78.04–78.14; 318/561, 600, 636, 592, 594

[56] References Cited

U.S. PATENT DOCUMENTS

| | | | |
|---|---|---|---|
| 4,355,273 | 10/1982 | DuVall | 318/561 |
| 4,594,622 | 6/1986 | Wallis | 360/77.08 |
| 4,879,612 | 11/1989 | Freeze et al. | 360/78.06 |
| 4,894,599 | 1/1990 | Ottesen et al. | 318/636 |

FOREIGN PATENT DOCUMENTS 63-86167  4/1988  Japan .

OTHER PUBLICATIONS

NTT, Report on the Use of Products of Research, vol. 28, No. 10 (1979) Peripheral Circuits for Driving an 800-MB Disk Apparatus, pp. 179–208.

Ciscato et al. Proc. Annu. Symp. Incremental Motion, 1988, vol. 17, pp. 129–142, Digital Positioning System for Disk Drives in Control System Devices.

Hanselmann et al. Proc. IECON, 1986, vol. 2, pp. 864–869, High Bandwidth Control of the Head Positioning Mechanism in a Winchester Disc Drive.

*Primary Examiner*—Aristotelis Psitos
*Assistant Examiner*—Steven A. Garland
*Attorney, Agent, or Firm*—Finnegan, Henderson, Farabow, Garrett and Dunner

[57] ABSTRACT

In a servo type magnetic head drive control device, a moving velocity of a magnetic head is controlled on the basis of an error between an actual moving velocity value of the magnetic head generated using servo data and a target velocity value set in accordance with a moving distance to a target position. When the magnetic head is moved to a predetermined position, transient control is performing by using finite time settling control on the basis of position information and velocity information of the magnetic head, and normal tracking control or tracking control using the finite time settling control is performed to form positioning control of the magnetic head. Also a difference between the head position and the position of the head generated from a model is determined and used to control head movement.

7 Claims, 13 Drawing Sheets

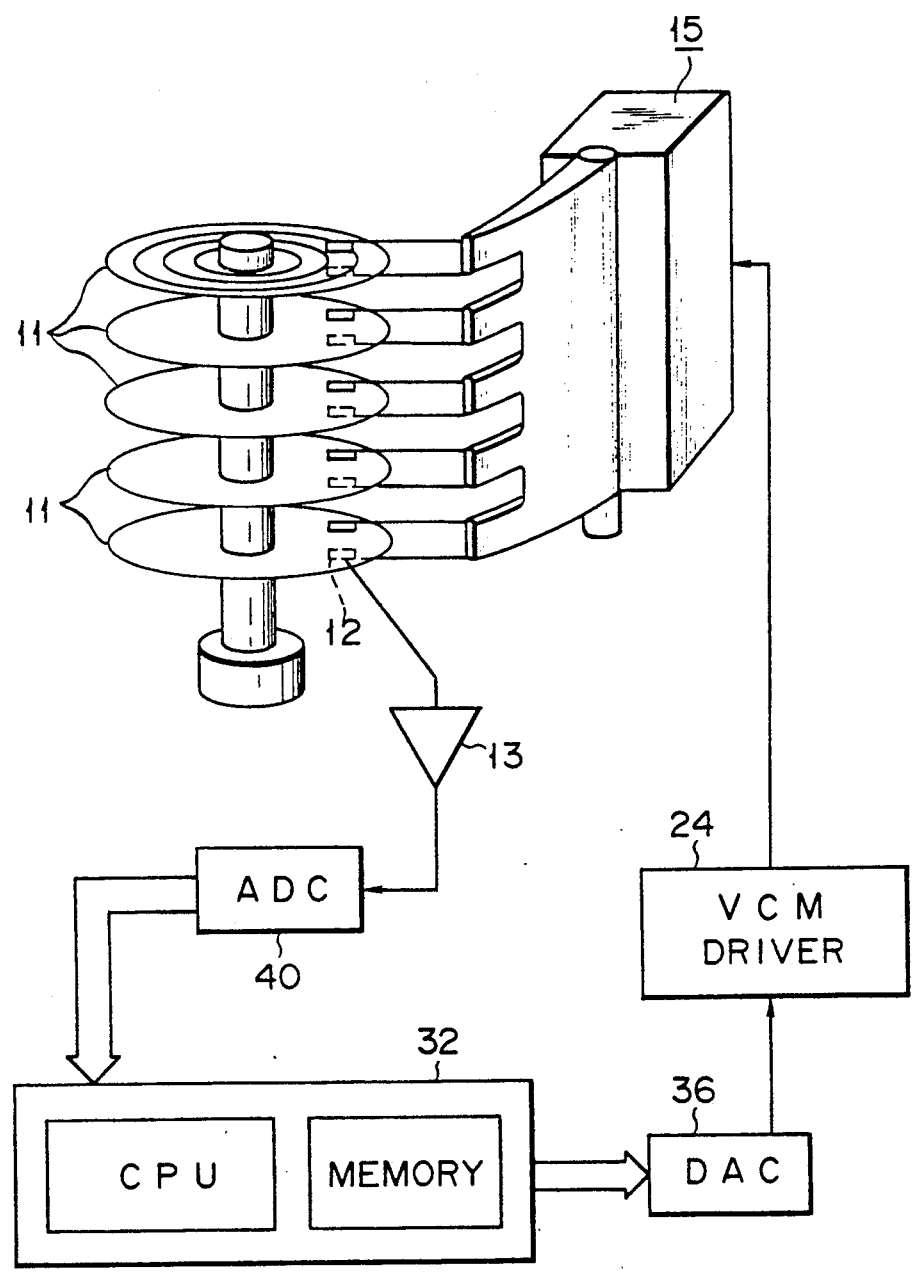
F I G. 13

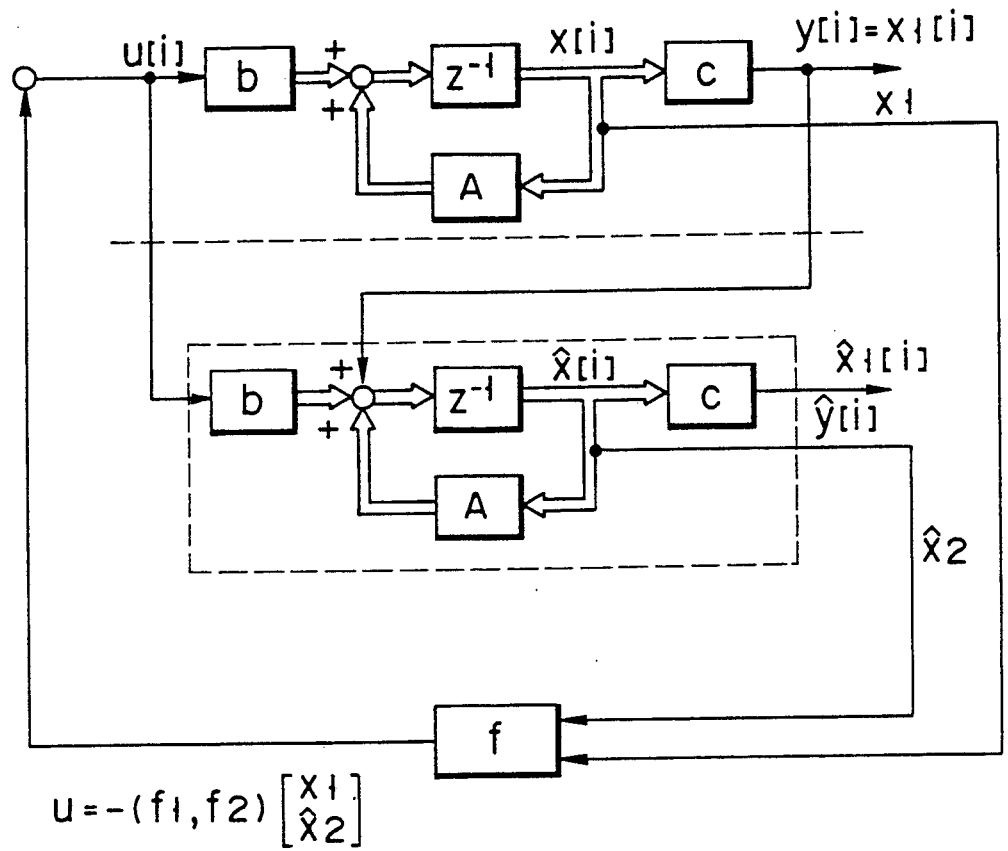
F I G. 14

MAGNETIC RECORDING/REPRODUCING APPARATUS CAPABLE OF REDUCING A SETTING TIME IN A HEAD POSITIONING CONTROL MODE

BACKGROUND OF THE INVENTION

1. Field of the Invention

The present invention relates to a magnetic head drive control device of a magnetic recording/reproducing apparatus using a servo scheme.

2. Description of the Related Art

Conventionally, a hard disk drive (HDD), for example, comprises a magnetic head drive control device for positioning a magnetic head at a target position (target track) of a recording medium by using servo data recorded beforehand on a servo surface of the recording medium. More specifically, this device includes a position signal decoder 10 as shown in FIG. 1. The decoder 10 receives a servo signal read out from a servo surface 11a of a recording medium 11 and amplified and supplied by a head amplifier 13.

A magnetic head of an HDD is composed of a servo head 12 and a plurality of data heads 14 corresponding to a plurality of data surfaces except for the servo surface 11a. The heads 12 and 14 are arranged to seek in the radial direction of the recording medium 11 by an actuator 15. The actuator 15 is constituted by a supporting mechanism 15a for supporting the heads 12 and 14, a rotary shaft 15b and a voice coil motor (VCM) 15c. The supporting mechanism 15a is driven to rotate around the shaft 15b by a driving force of the VCM motor 15c. The recording medium 11 is rotated by a spindle motor 16.

. The position signal decoder 10 generates a position error signal PE corresponding to a current position of the servo head 12. On the basis of a change in signal PE output from the decoder 10, a track counter 17 generates a track pulse TP each time the head 12 crosses a track. A velocity signal generator 18 differentiates the position error signal PE and generates a velocity signal VR corresponding to an actual moving velocity of the head 12. A compensation circuit 19 stabilizes a servo loop when a positioning control mode is executed on the basis of the position error signal PE.

Drive control is roughly classified into a velocity control mode and a positioning control mode. The positioning control mode is roughly classified into a transient control mode and a tracking control mode. In the velocity control mode, a microprocessor (CPU) 20 counts track pulses TP from the track counter 17 and calculates a distance to a target position to which the head 12 is to be moved. The CPU 20 refers to a preformed table representing a correspondence between a distance and an optimal target velocity and outputs target velocity data corresponding to the calculated distance. A target velocity generator 21 outputs a target velocity signal VT corresponding to the target velocity data from the CPU 20 to a mixing switching unit 22. Under the control of the CPU 20, the unit 22 outputs an error signal ES indicating a difference between the velocity signal VR and the target velocity signal VT to a VCM driver 24 via a mechanical filter 23 in the velocity control mode. The VCM driver 24 supplies a drive current corresponding to the error signal ES to the VCM 15c to drive the actuator 15. The CPU 20 exchanges various control signals and data with respect to a disk controller (HDC).

In the velocity control mode, as shown in FIGS. 2A through 2D, a control region is roughly classified into acceleration and deceleration regions. In the acceleration region, the error signal ES substantially reaches its maximum value (saturation level) since the error between the velocity signal VR and the target velocity signal VT is large. Therefore, a drive current corresponding to the error signal ES is supplied to the VCM 15c to accelerate the actuator 15. The CPU 20 updates the target velocity data each time the track pulse TP is output. As the head 12 moves closer to the target position, an absolute value of the target velocity signal VT is decreased. From a timing T1 at which the velocity signal VR reaches the target velocity signal VT, the actuator 15 is switched to deceleration on the basis of the decreased target velocity signal TV.

From a timing T2 at which the velocity of the head 12 becomes substantially 0, the velocity control mode is switched to the positioning control mode. A switching timing from the velocity control mode to the positioning control mode is determined by the CPU 20 by determining that a difference between the value of the track pulse TP from the track counter 17 and the target track becomes, e.g., one track.

In the positioning control mode, the mixing switching unit 22 outputs an output from the compensation circuit 19 to the VCM driver 24 as the signal ES. As a result, the head 12 is positioned (settled) at the center of the target track. The data head 14 is positioned at the center of the target track following the servo head 12. The CPU 20 switches the characteristics (e.g., an advancing amount of a phase) of the compensation circuit 19 to obtain optimal characteristics for each of the transient and tracking control modes.

The velocity control mode is a servo system as shown in FIG. 3. A predetermined voltage is supplied to the VCM driver 24. The driver 24 outputs a current proportional to the supplied voltage to the actuator 15. As a result, the actuator 15 operates at a certain velocity. The actual velocity signal VR generated from the servo signal by the position signal decoder 10 and the velocity signal generator 18 is compared with the target velocity signal VT, and a voltage proportional to the difference is supplied to the VCM driver 24. As a result, a current proportional to the difference is supplied to the actuator 15. Such a control operation is repeatedly performed to change the actual velocity closer to the target velocity.

The positioning control mode is a servo system as shown in FIG. 4. Difference data (indicating whether the magnetic head is located on a track or offset outside or inside from the center of the track) between actuator position information X from the actuator 15 and a target position R is supplied to the position signal decoder 10. The decoder 10 decodes the difference data and outputs the data to the position error signal compensation circuit 19. The circuit 19 advances a phase to compensate for a delay produced by a secondary integral calculation when a position is to be controlled by a current.

Generally, in a servo system, by increasing a loop gain in consideration of the instability of the system, a tracking error can be reduced to improve a response characteristic. Actually, however, a frequency band of a sensor system (e.g., the head amplifier 13 and the position signal decoder 10) is limited. In addition, the influence of a resonant point of a mechanism system cannot be ignored. Therefore, if the gain is increased too high in order to shorten a settling time, the system becomes unstable. Therefore, since the gain must be adjusted to be a proper value, an essential index for determining the performance of the servo system such as a tracking performance or a response speed cannot be improved better than a specific predetermined limit.

An analog servo system is generally expressed by a block diagram as shown in FIG. 5. In this analog servo system, a relationship between an input (target value R) and an output (result C) is Laplace-transformed as represented by equation (1):

$$C = G(s) \cdot R(s)/(1 G(s)H(s)) \qquad (1)$$

where G, H and R are the rational polynomials of s in a linear system. Therefore, equation (1) can be rewritten as the following equation (2) by using N and D (rational polynomials of s):

$$C = N(s)/D(s) \qquad (2)$$

Equation (2) can be expressed as follows by using s:

$$C = \frac{K^* \pi (s + dp)}{S^{K*} \pi (S + a1)^* \pi (s^2 + bm^*x + cn)} \qquad (3)$$

Equation (3) can be developed into partial fractions, and a time response c(t) of C(s) is obtained by equation (4) by Laplace-transforming the partial fractions:

$$C(t) = \Sigma Aq^* \exp(-\delta qt) + \Sigma Br^*(1/\omega r)^* \exp(-\alpha rt) \cdot {}^* \sin(\omega rt) \qquad (4)$$

for $\delta q$, $\alpha r$ and $\omega r > 0$.

In equation (4), $\exp(-\delta t)(\delta > 0)$ (i.e., $\exp(-\delta qt)$ and $\exp(\delta rt)$) is always included in each term of c(t). Therefore, all terms converge to 0 for $t \to \infty$ but a predetermined value always remains for a finite time.

As described above, since a head drive control device using an analog closed servo control scheme depends on the performance of a servo system, improvements in performance are limited. More specifically, a settling time of the head in the positioning control mode cannot be reduced to be shorter than a certain predetermined period of time.

SUMMARY OF THE INVENTION

It is an object of the present invention to provide a magnetic head drive control device of a magnetic recording/reproducing apparatus, which can reduce a settling time in a head positioning control mode to realize a high-speed head drive control operation in a servo type magnetic recording/reproducing apparatus.

According to the first aspect of the present invention, there is provided a magnetic head drive control device of a magnetic recording/reproducing apparatus, which performs movement control and positioning control including transient control and tracking control for a magnetic head on the basis of servo data recorded beforehand in a recording medium, comprising: position information generating means for generating position information of the magnetic head from the servo data; velocity information generating means for generating velocity information of the magnetic head from the position information generated by the position information generating means; target velocity information generating means for calculating a moving distance from a difference between the position information generated by the position information generating means and target position information and generating target velocity information in accordance with the moving distance; velocity control means for outputting velocity control information for controlling a velocity of the magnetic head on the basis of a difference between the velocity information and the target velocity information; movement control means for moving the magnetic head to a predetermined position on the basis of the velocity control information output from the velocity control means; and positioning control means for performing positioning control by using finite time settling control on the basis of the position information and the velocity information of the magnetic head after the movement control for the magnetic head by the movement control means is finished.

According to the second aspect of the present invention, there is provided a magnetic head drive control method of a magnetic recording/reproducing apparatus, which performs movement control and positioning control including transient control and tracking control for a magnetic head on the basis of servo data recorded beforehand in a recording medium, comprising the computer steps of: generating position information of the magnetic head from the servo data; generating velocity information of the magnetic head; calculating a moving distance from a difference between the position information and target position information and generating target velocity information in accordance with the moving distance; controlling a velocity of the magnetic head and moving the magnetic head to a predetermined position on the basis of a difference between the velocity information and the target velocity information; and performing positioning control by using finite time settling control on the basis of the position information and the velocity information of the magnetic head after the magnetic head is moved to the predetermined position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A through 2D are timing charts showing various signals used in a magnetic head drive control device, in which FIG. 2A shows a servo head position error signal PE, FIG. 2B shows a track pulse TP, FIG. 2C shows a velocity signal VR and a target velocity signal VT, and FIG. 2D shows an error signal ES between the velocity signal VR and the target velocity signal VT;

FIG. 13, is a block diagram showing another embodiment of a head, drive control device of the present invention;

FIG. 14. is a block diagram showing a model obtained when a velocity estimate observer is added to the finite time settling control.

DETAILED DESCRIPTION OF THE PREFERRED EMBODIMENTS

Figure 1:
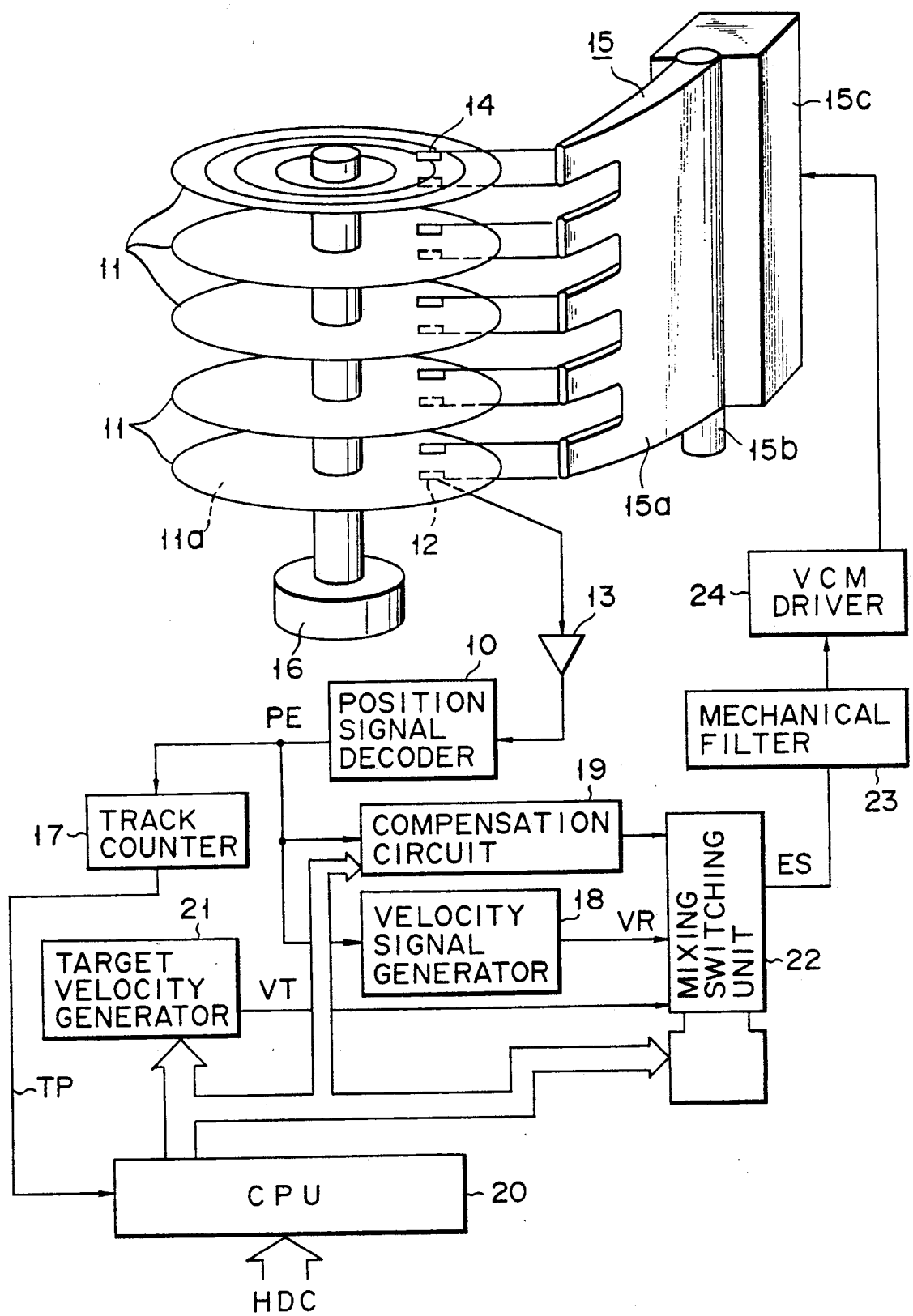
FIG. 1 is a block diagram showing a conventional magnetic head drive control device of a magnetic recording/reproducing apparatus.
Figure 8:
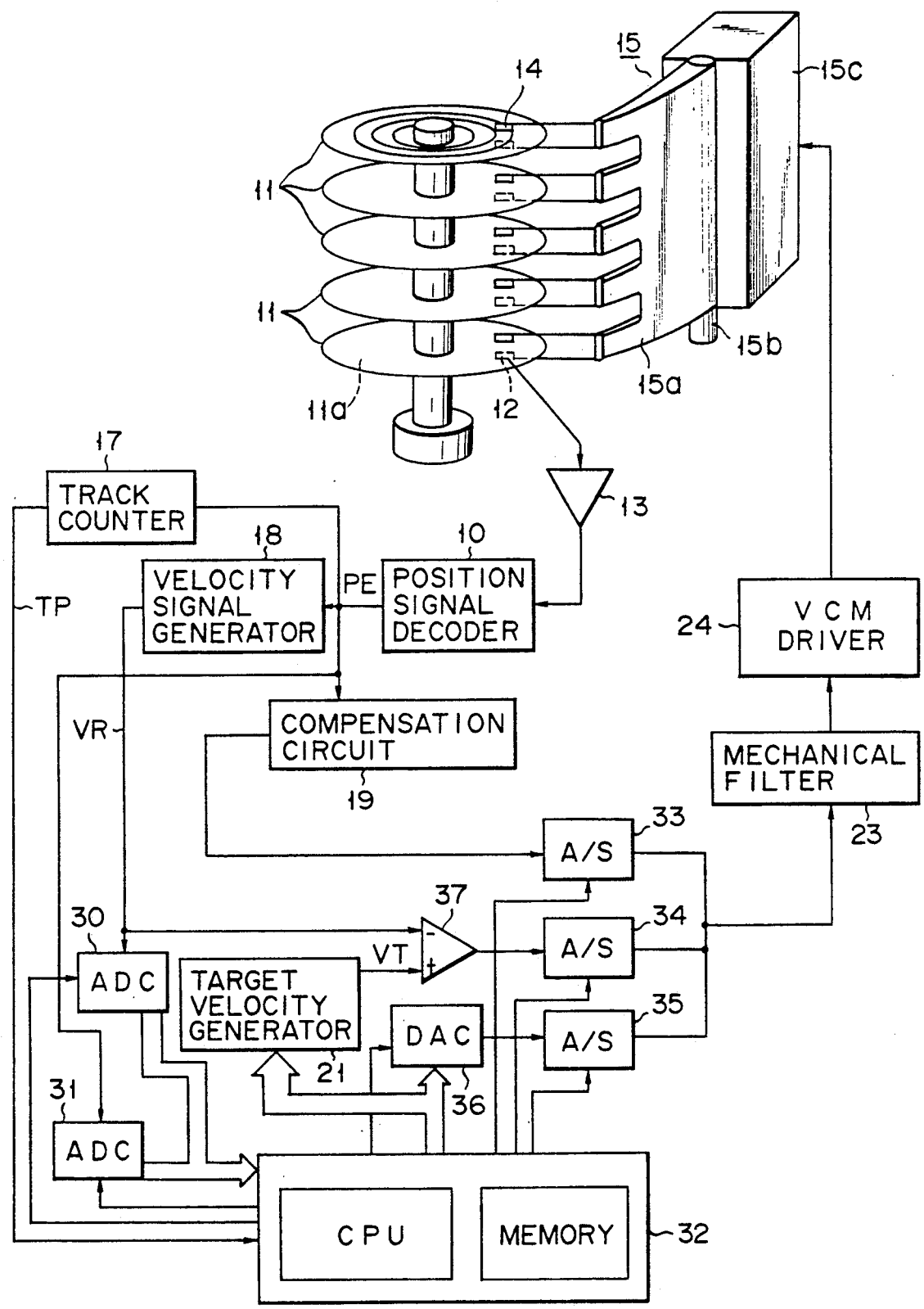
FIG. 8 is a block diagram showing an arrangement of a head drive control device according to an embodiment of the present invention.

FIG. 8 is a block diagram showing an arrangement of a head drive control device according to the present invention. In FIG. 8, the same reference numerals as in FIG. 1 denote the same parts and a detailed description thereof will be omitted. This embodiment comprises an analog/digital converter (ADC) 30 for converting an analog velocity signal VR generated by a velocity signal generator 18 into digital data, and an ADC 31 for converting an analog position error signal PE generated by a position signal decoder 10 into digital data. Each of the ADCs 30 and 31 outputs digital data to a computer (CPU) 32. The CPU 32 has a function of executing a positioning control mode based on finite time settling control which is the gist of the present invention. This embodiment also includes analog switches (A/Ss) 33 through 35 controlled by the CPU 32. The A/S 33 transfers a position error signal from a compensation circuit 19 to a mechanical filter 23. The A/S 34 transfers a velocity error signal from a differential amplifier 37 to the filter 23. The A/S 35 transfers a position error signal from a digital/analog converter (DAC) 36 to the filter 23. In the positioning control mode according to the finite time settling control, the DAC 36 converts digital data output from the CPU 32 into an analog position error signal. Other arrangements of this embodiment are the same as those shown in FIG. 1 and a detailed description thereof will be omitted.

An operation of the embodiment shown in FIG. 8 will be described below. When a head drive control operation with respect to a target position is started, a velocity control mode is executed as described above. In this velocity control mode, the A/S 34 is turned on by the CPU 32 to transfer a velocity error signal from the differential amplifier 36 to a VCM driver 24 via the mechanical filter 23. As a result, velocity control is executed for a servo head 12 as described above to move the head 12 until a timing T2 as shown in FIG. 2C.

Figure 2A:
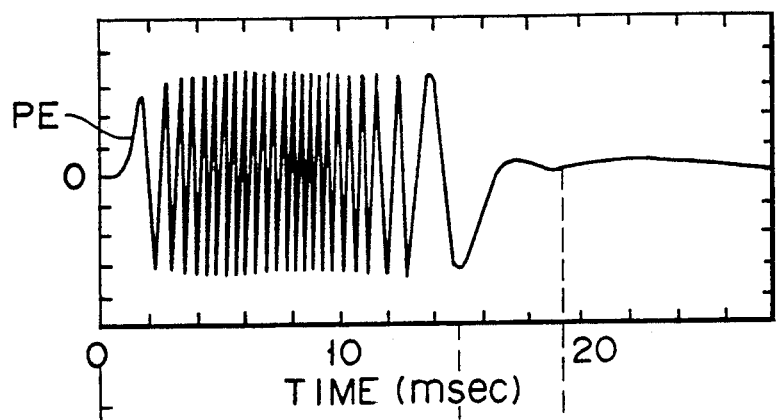
Figure 2B:
Figure 2C:
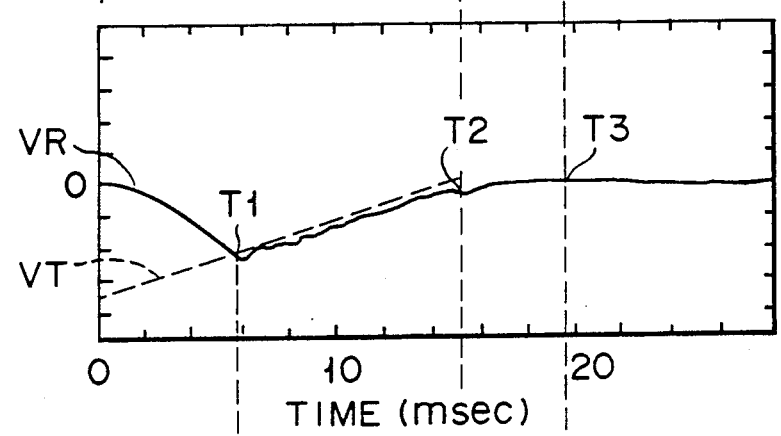
Figure 2D:
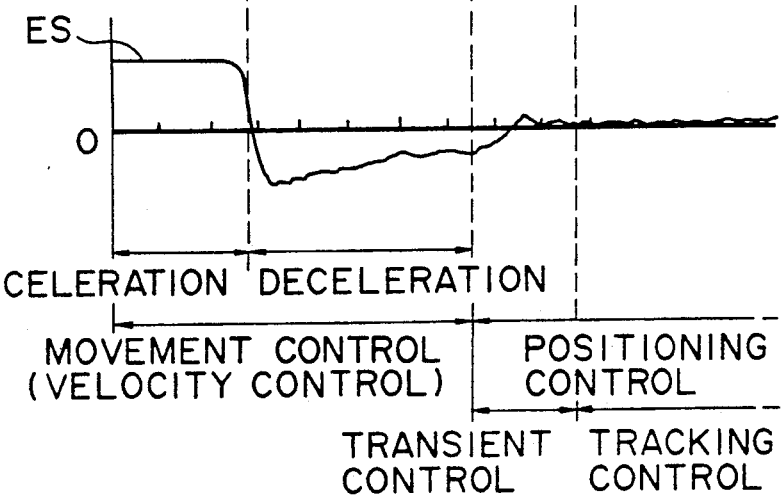
Figure 3:
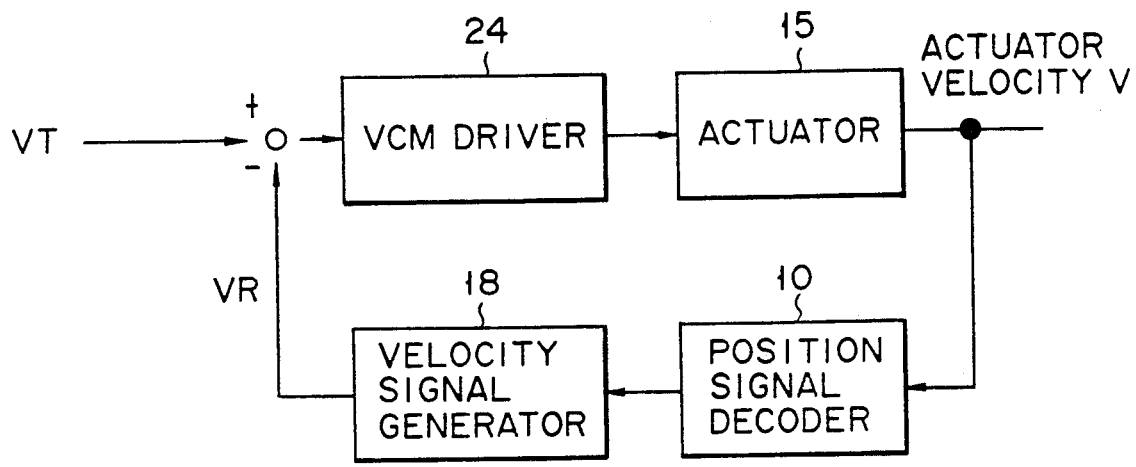
FIG. 3 is a block diagram showing a servo system in a velocity control mode; in a positioning control mode.
Figure 4:
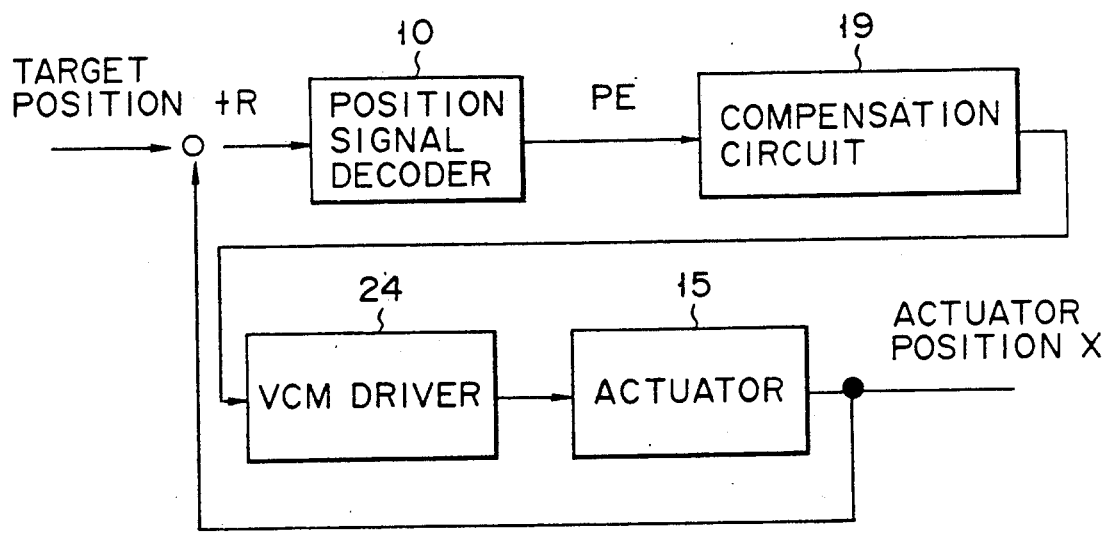
Figure 5:
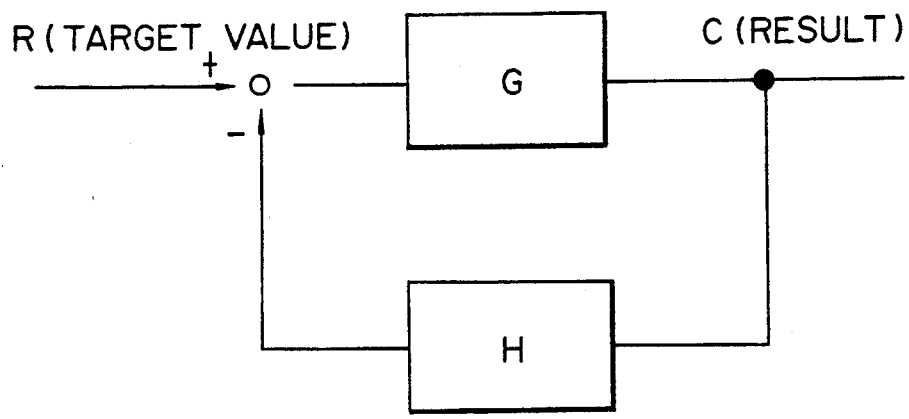
FIG. 5 is a block diagram showing a general analog servo system.

When the head 12 passes the timing T2 shown in FIG. 2C, the CPU 32 turns on the A/S 35. The CPU 32 detects a position of an actuator 15 in accordance with a position error signal obtained from the ADC 31 and a velocity signal estimated therefrom or a velocity signal obtained from the ADC 30, and outputs an arithmetic operation result (i.e., an arithmetic operation result (u(i) in equation (7) to be described later) which satisfies finite time settling conditions) for executing the positioning control mode according to the finite time settling control to the DAC 36. The A/S 35 transfers the position error signal from the DAC 36 to the VCM driver 24 via the mechanical filter 23. As a result, as shown in FIG. 2C, transient control is performed for the head 12 in an interval from point T2 to point T3 by the positioning control mode according to the finite time settling control. Tracking control in the conventional positional control mode is executed from the point T3 to the center of the target position (center of a target track). That is, the A/S 33 is turned on to transfer the position error signal from the compensation circuit 19 to the VCM driver 24 via the mechanical filter 23.

Figure 6:
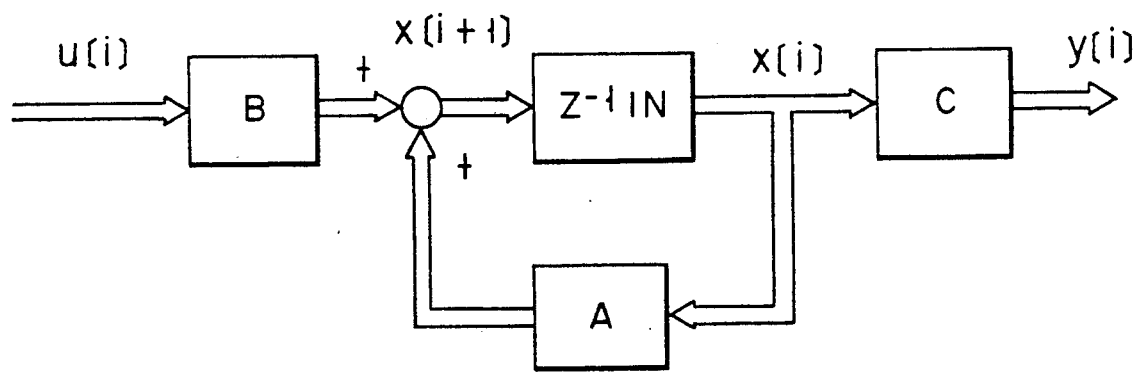
FIG. 6 is a block diagram showing a head positioning system of a hard disk drive (HDD)
Figure 7:
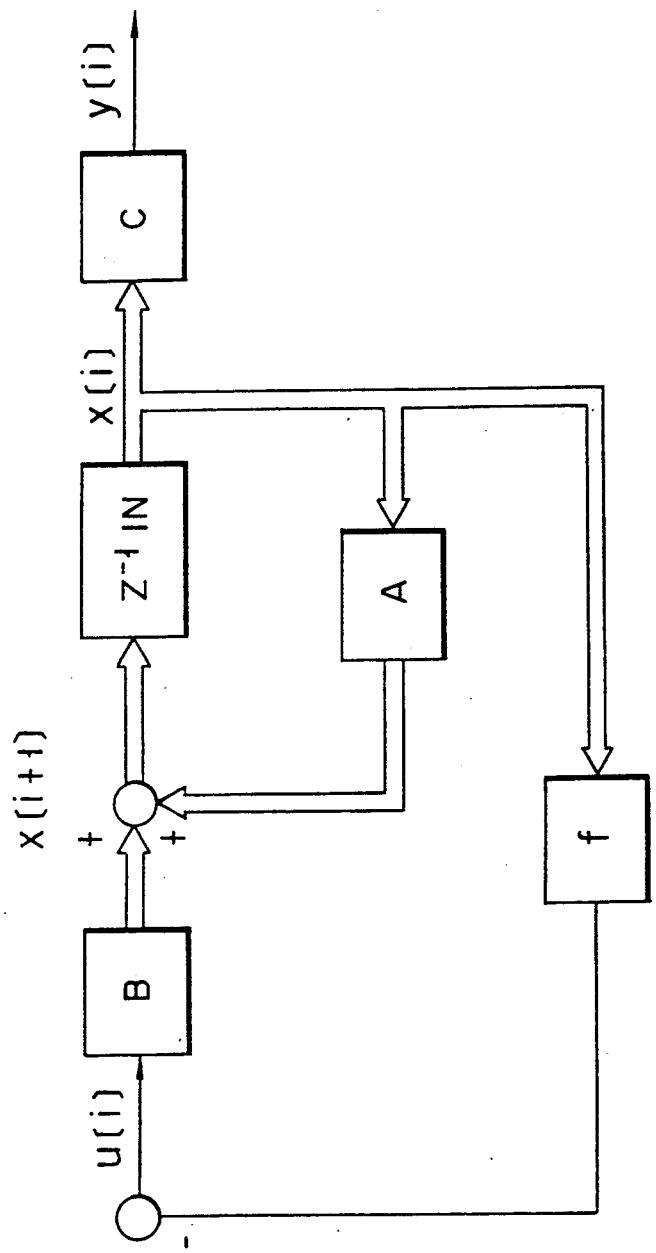
FIG. 7 is a block diagram showing a servo system in finite time settling control.

The finite time settling control is normally expressed by block diagrams as shown in FIGS. 6 and 7. FIG. 6 shows an object to be controlled (in this case, a head positioning system of the HDD).

The head positioning system shown in FIG. 6 is expressed by the following state equations:

$$x(i+1)=A^*x(i)+B^*u(i) \quad (5)$$

$$y(i)=C^*x(i) \quad (6)$$

where u(i) is a control input (an input of the DAC 36 shown in FIG. 8), x(i) is a parameter (a vector corresponding to the position and velocity of the head positioning control system) representing a state of the object to be controlled, "z*1n" is the specific unit time delay of digital control, which is a symbol appearing as a result of z transform, in is the unit matrix, x(i+1) is a parameter indicating a state of the object to be controlled advanced by one unit with respect to x(i), y(i) is the observation amount of the object to be controlled such as a position or velocity, and each of A, B and C is the matrix or vector, i.e., a constant matrix or vector called a system matrix representing properties of the object to be controlled (in this case, the actuator 15 of the positioning system, the head 12, a recording medium 11 and the like).

By inputting a certain value to the control input u(i) (i.e., the input of the DAC 36), an effect is given to the object to be controlled represented by A, B and C to change the state x(i) (i.e., the position or velocity of the head 12 of the HDD). In this case, controlling the object to be controlled means that the state x(i) of the object to be controlled (head positioning control system) is observed, i.e., the position or velocity of the head 12 is read out from the ADCs 30 and 31 to set a feedback coefficient vector f as shown in FIG. 7 and the value of the control input u(i). More specifically, the data x(i) obtained from the ADCs 30 and 31 is used to calculate "$u(i)=-f^*x(i)$", and the result is supplied to the DAC 36.

In order to perform control so as to realize finite time settling, determination of the feedback coefficient vector f as shown in FIG. 7 must be executed to satisfy the following relation:

$$u(i) = -f^*x(i) \quad (7)$$

More specifically, assuming that $x1$ is a head position and $x2$ is a head velocity, the following equation is obtained:

$$-(f1, f2)\begin{pmatrix} x2 \\ x1 \end{pmatrix} = -(f1 x1 + f2 x2)$$

By substituting the above equation into equation (5), a closed loop system is represented as follows:

$$x(i+1) = (A - Bf)^* x(i) \quad (8)$$
$$y(i) + C^* x(i) \quad (9)$$

In this case, if all specific values of a matrix (A-Bf) are set in a unit circle, the system becomes stable.

In order to perform control to realize the finite time settling, the specific values in the unit circle must be set to be 0. Such a matrix is called an exponent zero matrix in which the following relation is established for a certain integer $j$ (<):

$$(A-Bf)^i = 0 \; (i = j, j+1, \ldots) \quad (10)$$

When the feedback coefficient vector f is preliminarily set so as to satisfy equation (10), the following equation (11) is obtained:

$$x(i) = (A-Bf)^i {}^* x(0) \; (i = j, j+1, \ldots) \quad (11)$$

As a result, all states obtained after a time j from an arbitrary initial state x(0) can be set to be 0. Such a state feedback is called finite time settling control. A minimum j which satisfies equation (10) is called a settling time. A state feedback which minimizes the settling time is called minimum time state settling control, and this settling time is at most the order n of an object to be controlled with respect to the arbitrary initial state. Therefore, in the finite time settling control, assuming that a sample period is T, continuous time response $x(t)=0$ if $t>nT$. Therefore, as T is decreased, $x(t)=0$ is obtained at an earlier timing. In this case, however, since u(i), i.e., a control amount is increased, T is limited in a range of a power capacity of the system.

In the finite time settling control, therefore, the CPU 32 uses the values of the A and B matrixes (C is unnecessary) of the HDD as an object to be controlled and the f vector value (the value satisfying the conditions for setting all the specific values of the matrix (A-Bf) to be 0) to output the state (position or velocity) obtained from the ADCs 30 and 31 and u(i) obtained by calculating equation (7) to the DAC 36, thereby driving the VCM driver 24 to drive the actuator 15. As a result, the position or velocity of the head 12 can be controlled in a desired state (in which the position or velocity becomes 0 within a finite time).

Figure 10:
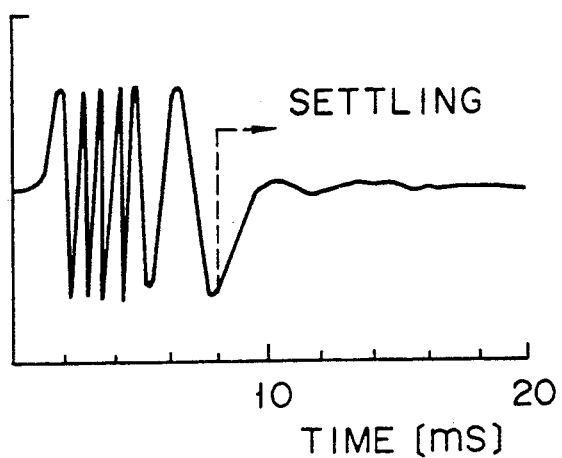
FIG. 10 is a timing chart showing a settling time in a positioning control mode of a conventional scheme.
Figure 11:
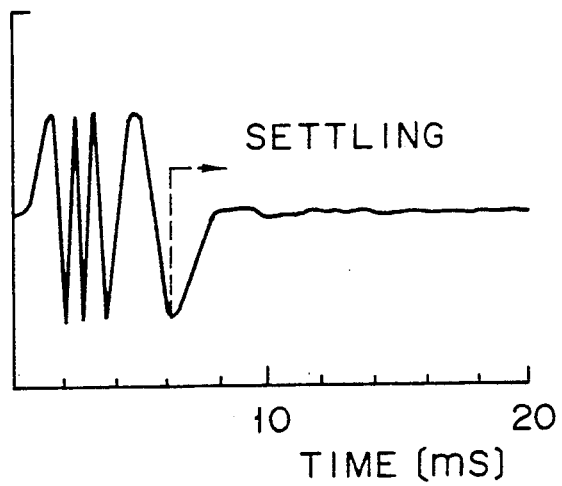
FIG. 11 is a timing chart showing a settling time in a positioning control mode in the finite time settling control.
Figure 12:
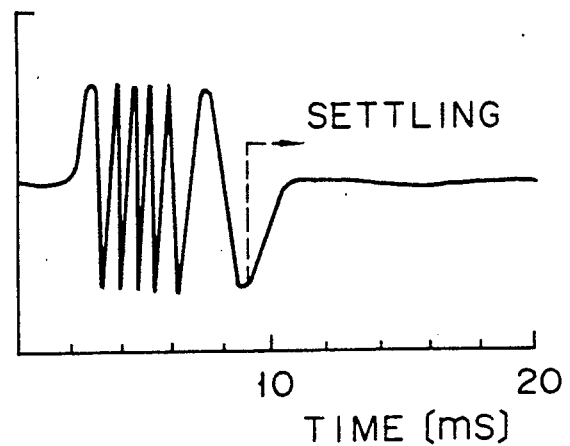
FIG. 12 is a timing chart showing a settling time obtained when a disturbance P is added in the positioning control mode in the finite time settling control.

By using the positioning control mode in the finite time settling control as described above in the transient control mode as shown in FIGS. 2A through 2D, a time required for the positioning control mode can be reduced. More specifically, a settling time in the positioning control mode in the finite time settling control shown in FIG. 11 can be reduced to be shorter than that in the positioning control mode using the conventional control scheme shown in FIG. 10.

The controls of CPU 32 will now be described with reference to the flowchart shown in FIGS. 15A through 15C.

Figure 15A:
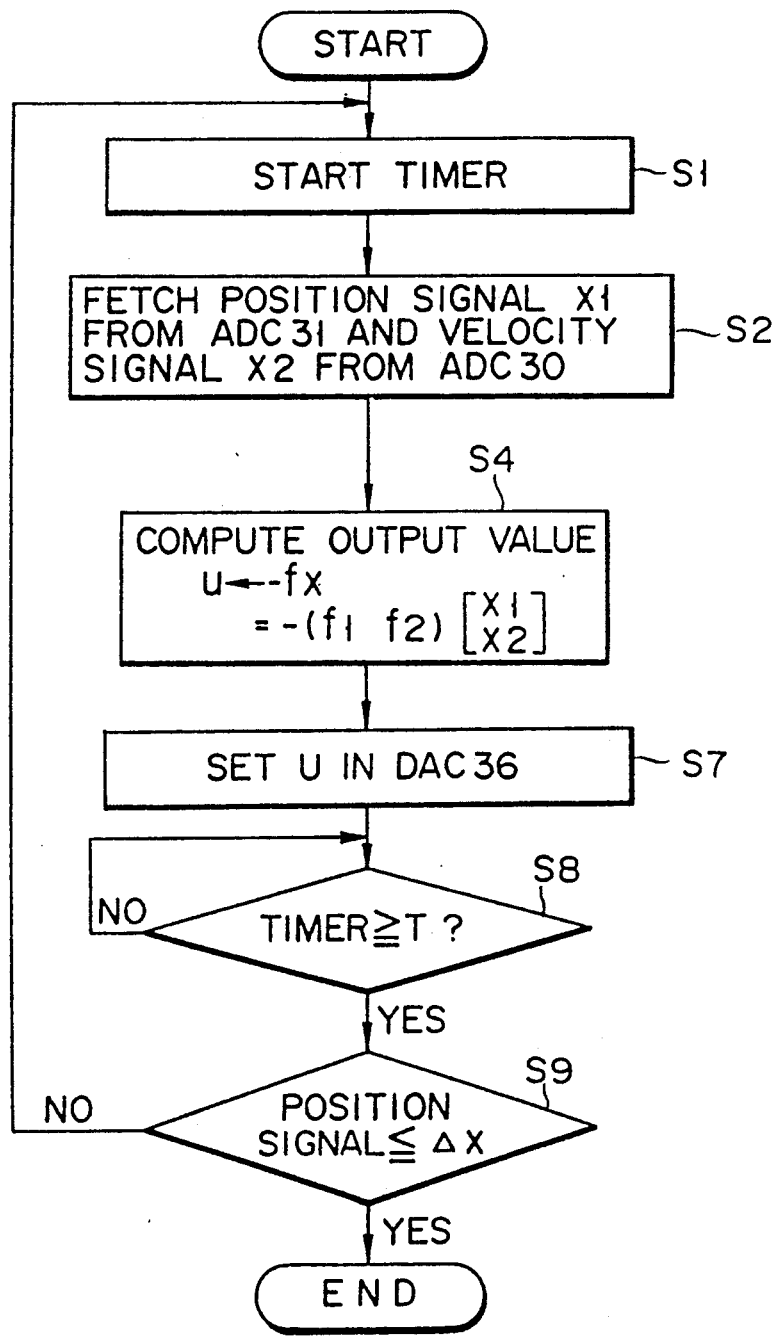
FIGS. 15A through 15C are flow charts showing controls of CPU 32.
Figure 15B:
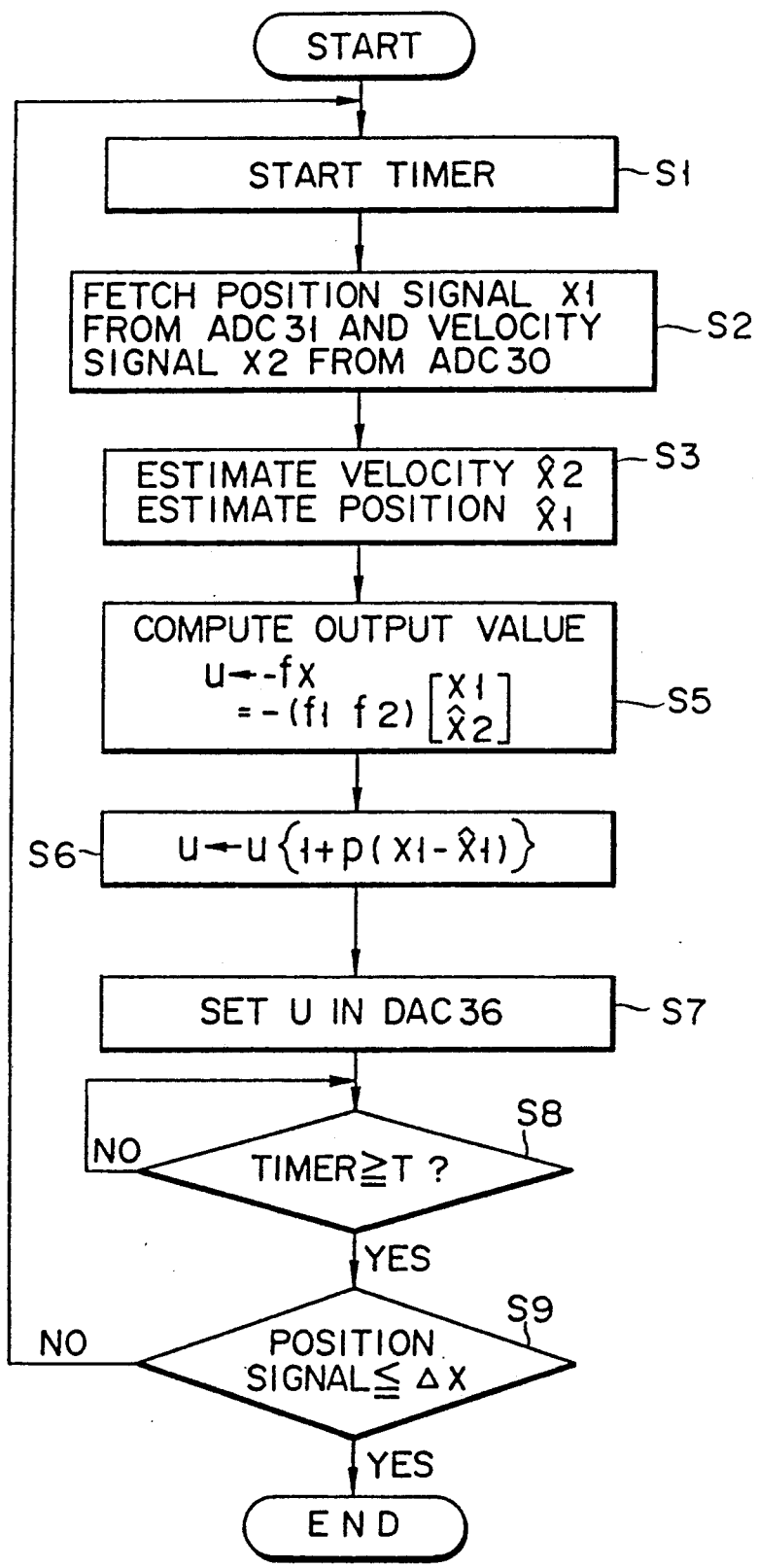
Figure 15C:
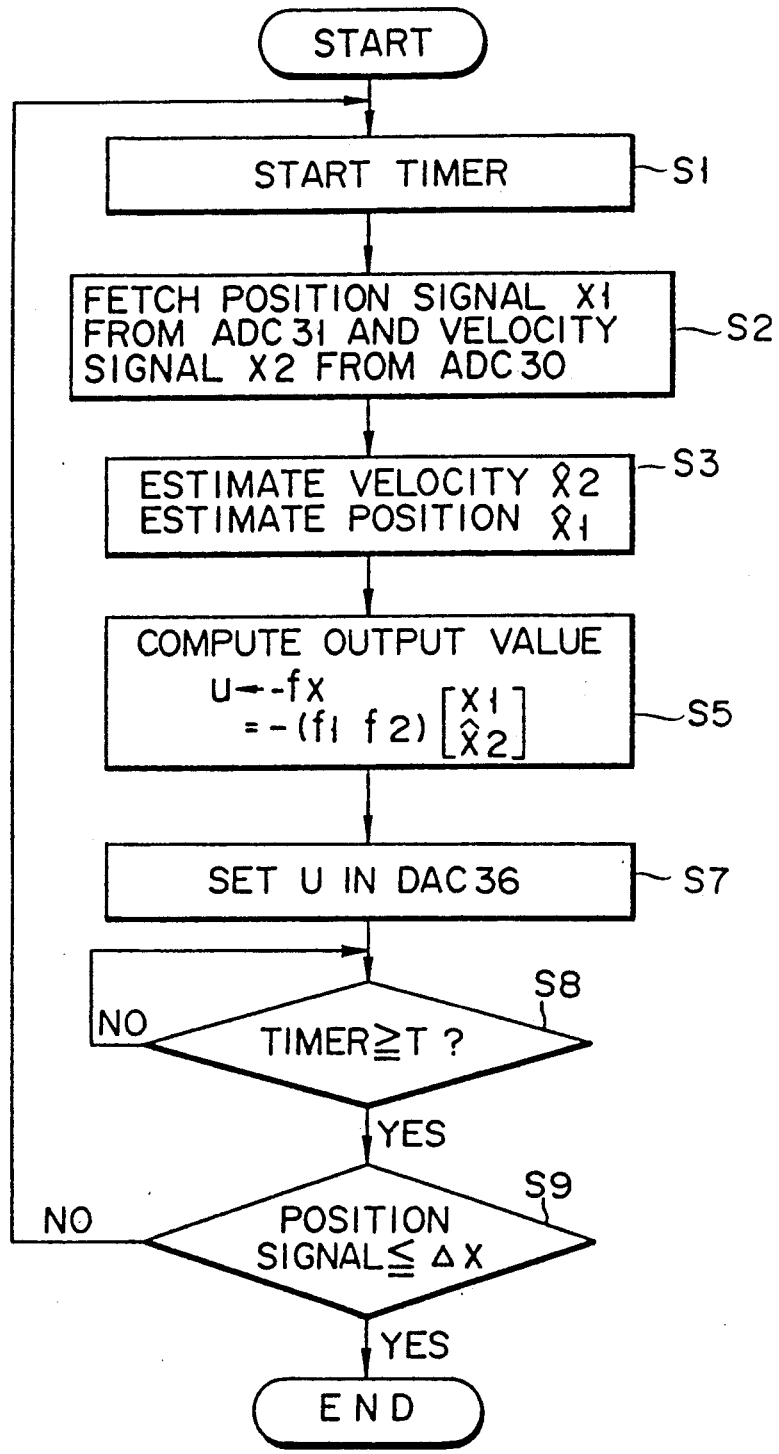

First, in FIG. 15A the CPU 32 clears and starts a software timer (not shown) in step S1. The analog position error signal PE of the magnetic head output from the position decoder 10 is converted by the ADC 31 into the digital position error signal $x_1$. The CPU 32 receives the digital position error signal $x_1$. Similarly, the analog velocity signal VR of the magnetic head output from the velocity signal generator 18 is converted by the ADC 30 into the digital velocity signal $x_2$. The CPU 32 receives the digital velocity signal $x_2$ (step S2) Then, the CPU 32 computes, in step S4, the previous equation (7) in accordance with the received position error signal $x_1$ and the velocity signal $x_2$. In step S7, the CPU 32 outputs the u[i] as a result of the above computation of the equation (7) to the DAC 36. Then, the CPU 32 determines, in step S8, whether the timer value is equal to or greater than the predetermined sampling time T. When YES in step S8, the CPU 32 determines in step S9 whether the position signal is equal to or smaller than the settling allowance level $\Delta Ax$. If NO in step S9, the CPU 32 returns to step S1 and repetitively executes steps S1, S2, S4, and S7 to S9 until the condition of step S9 is satisfied. If YES is determined in step S9, the CPU 32 completes the transition control. More specifically, the CPU 32 completes the finite time settling control and enters into the position control mode.

In the above description, a case has been exemplified wherein the analog position error signal PE and the analog velocity signal VR obtained by actually measuring the finite time settling control, are converted into digital signals. However, it is sometimes not preferred to use the actual measured value as the velocity signal $x_2$ from a view point of an S/N ratio.

In order to improve the precision of control, an embodiment where the finite time settling control is performed by using an estimate value $x_2$ as the velocity signal $x_2$ will now be described with reference to FIG. 14. The block diagram above the dotted straight line is identical to those shown in FIGS. 6 and 7 and shows, as a control target, the servo system of the head driving control apparatus shown in FIG. 8. Further, the block diagram beneath the dotted straight line and enclosed by the dotted lines shows a model of the control target of the servo system of the head driving control apparatus shown in FIG. 8. This model is provisionally created by the CPU 32. Creating provisionally the servo system model by the CPU 32 means that the parameters of the servo systems are preliminarily set, and the computations (computations peculiar to the actual control target) between the data to be input in the servo system and the preliminarily set parameters are performed to obtain an output which will be obtained in the actual control target. This model of the servo system is called a velocity estimate observer. The model of the control target receives the computation result u[i] of equation (7) and y[i] output from the actual control target. The actual measured value $x_1$ of the position output from the servo system of the actual control target, and the estimate value $x_2$ of the velocity output from the velocity estimate observer are supplied to the feedback coefficient vector f to obtain the input u[i] of the servo system of the actual control target. The estimate velocity $\hat{x}_2$ is represented by the following equation.

$\hat{x}_2 = (u, x_1)$.

An operation of the block diagram shown in FIG. 14 will now be described with reference to the flowchart shown in Fig. 15C. The operations of the steps S1 and S2 have been described previously and therefore the description thereof is omitted. Succeedingly, the CPU 32 estimates the velocity using the digital position error signal $x_1$ received in step S2. More specifically, the CPU 32 obtains the estimate value $\hat{x}_2$ of the velocity by computing, by using the received position error signal $x_1$, the model of the servo system of the control target which is formed provisionally. Then, in step S5, the CPU 32 computes the equation (7) in accordance with the position error signal $x_1$ of the received measured value and the velocity signal $\hat{x}_2$ of the estimate value obtained by the computation. Then, the CPU 32 advances to step S7. The operations of steps S7 to S9 has already been described and therefore the description thereof will be omitted. In this embodiment, the use of the estimated velocity value can improve the velocity control.

In the embodiments shown in FIGS. 7 and 14, when a disturbance is added to the servo system, or the parameters of the servo system are fluctuated due to the change of the ambient temperature or time variations, the settling time may sometimes be longer than that when no disturbance is added and the parameters of the servo system are fluctuated.

An embodiment which can remove the influence due to the disturbance and the fluctuations of the parameters will now be described with reference to FIG. 9.

Figure 9:
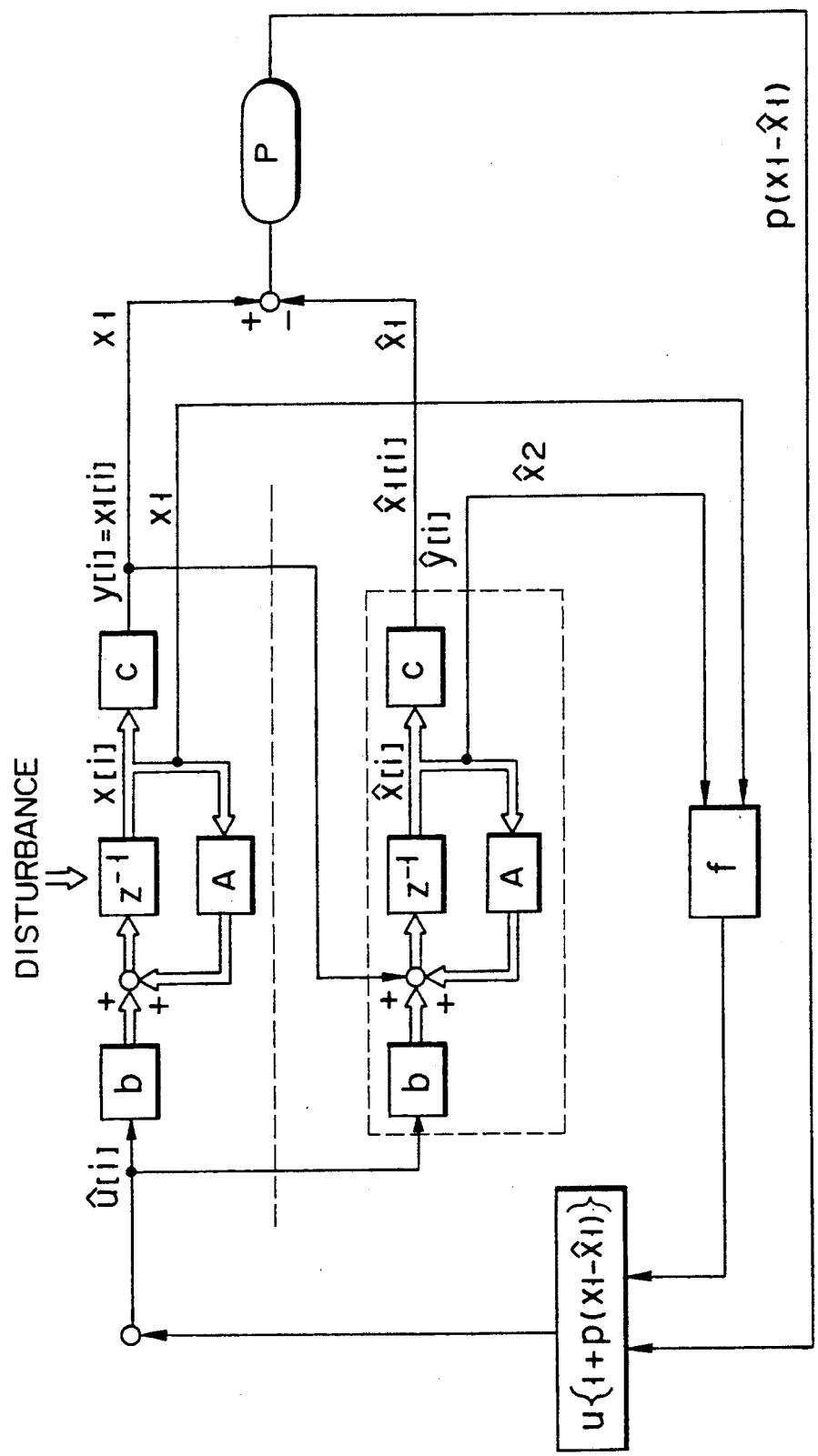
FIG. 9 is a block diagram showing a model obtained when a disturbance observer P is added to the finite time settling control.

In the block diagram shown in FIG. 9, a functional block executing computation P and a functional block executing computation $u\{1+P(x_1-x_1)\}$ are further provided in addition to the block diagram shown in FIG. 14. The computation P indicates a function of computing $\alpha(x_1-x_1)^2$ and $\beta(x_1-x_1)$ ($\alpha$ and $\beta$ are constants) between the position error signal $x_1$ which is a measured value output from the servo system of the control target, and the position error signal $x_1$ which is an estimate value output from the model of the servo system. The computation result is hereinafter referred to as $P(x_1-x_1)$. As described, an additional feedback loop comprised of the functional block executing computation $P(x_1-x_1)$ and the functional block executing computation $u\{1+P(x_1-x_1)\}$ is called a disturbance observer.

An operation of the embodiment shown in FIG. 9 will now be described with reference to the flowchart shown in FIG. 15B. The operations of the steps S1 and S2 have already been described and therefore the description thereof will be omitted. The CPU 32 advances to step S3 to estimate the velocity by using the digital position error signal $x_1$ received in step S2. More specifically, the CPU 32 computes, by using the received position error signal $x_1$, the estimate value $x_2$ of the velocity and the estimate value $x_1$ of the position by using the servo system model of the control target provisionally formed. In the step S5, the CPU 32 computes the equation (7) in accordance with the received position error signal $x_1$ which is a measured value and the velocity signal $x_2$ which is the estimate value and obtained from the computation, to thereby obtain the input value u of the servo system. In the step S6, the CPU 32 computes $u\{1-P(x_1-x_1)\}$ by using the computation result $P(x_1-x_1)$ which is an output from the functional block executing computation P, and the input value u of the servo system computed in step S5. The result of the computation of $u\{1+P(x_1-x_1)\}$ is denoted as u. Then, the CPU 32 advances to step S7. The operations of steps S7 to S9 has already been described and therefore the description thereof will be omitted. In this embodiment, as described in step S6, the input u of the control target is obtained by using the computation result $P(x_1-x_1)$ computed by using the position error signal $x_1$ which is a measured value and the position error signal $x_1$ which is the estimate value output from the servo system model. Accordingly, the settling delay due to the disturbance or the fluctuations of the parameters of the servo system can be minimized, resulting in reduced settling time.

FIG. 13 is a block diagram according to the second embodiment of the present invention. In FIG. 13, the same reference numerals denote the same parts and a detailed description thereof will be omitted. In the second embodiment, an ADC 40 for converting a position signal from a servo head 12 into digital data is additionally provided, and a CPU 32 fetches a position error signal and a velocity signal to execute all control operations by digital processing. In this manner, a hardware arrangement can be simplified.

In the above embodiments, in the positioning control mode, the transient control is performed by using the finite time settling control, and the tracking control is performed by using the conventional control model. The present invention, however, is not limited to the above embodiments. For example, both the transient control and the tracking control may be performed by the same finite time settling control model.

Additional advantages and modifications will readily occur to those skilled in the art. Therefore, the specific details, representative devices, and illustrated examples shown and described. Accordingly, various modifications may be made without departing from the spirit or scope of the general inventive concept as defined by the appended claims and their equivalents.

What is claimed is:

1. A magnetic head drive control device for a magnetic recording/reproducing apparatus, which performs movement control and positioning control including transient control and tracking control for a magnetic head on the basis of servo data pre-recorded on a recording medium, comprising:

position information generating means for generating position information of the magnetic head from the servo data;

velocity information generating means for generating velocity information of the magnetic head from the position information;

target velocity information generating means for calculating a moving distance from a difference between the position information and target position information and for generating target velocity information in accordance with the moving distance;

velocity control means for generating velocity control information for controlling velocity of the magnetic head on the basis of a difference between the velocity information and the target velocity information;

movement control means for moving the magnetic head to a predetermined target position on the basis of the velocity control information;

positioning control means for performing positioning control using finite time settling control on the basis of the position information and the velocity information of the magnetic head after movement control of the magnetic head by the movement control means; and disturbance observer means having a computer, for returning to an input terminal of the magnetic head drive control device in a feed-forward manner, a difference between magnetic head position and a position of the magnetic head obtained by a model created in the computer.

2. the device according to claim 1, wherein said positioning control means includes means for performing the transient control by using the finite time settling control.

3. The device according to claim 1, wherein said positioning control means includes means for performing both the transient control and the tracking control by using the finite time settling control.

4. The device according to claim 1, further comprising:

converting means for converting the position information and the velocity information into digital values and supplying the digital values to the target velocity information generating means; and converting means for converting the velocity control information into analog information and supplying the analog information to the movement control means.

5. A magnetic head drive control method for a magnetic recording/reproducing apparatus, which performs movement control and positioning control including transient control and tracking control for a magnetic head on the basis of servo data pre-recorded on a recording medium, comprising the steps of:

generating position information of the magnetic head from the servo data;

generating velocity information of the magnetic head;

calculating a moving distance from a difference between the position information and target position information;

generating target velocity information in accordance with the moving distance;

controlling velocity of the magnetic head and moving the magnetic head to a predetermined position on the basis of a difference between the velocity information and the target velocity information;

performing positioning control using finite time settling control on the basis of the position information and the velocity information of the magnetic head after the magnetic head is moved to the predetermined position and returning to an input terminal of the magnetic head drive control device, in a feed-forward manner, a difference between the magnetic head position and a position of the magnetic head obtained by a model created in a computer.

6. The method according to claim 5, wherein said positioning control step performs the transient control by using the finite time settling control.

7. The method according to claim 3, wherein said positioning control step performs both the transient control and the tracking control by using the finite time settling control.

* * * * *